UNITED STATES PATENT OFFICE.

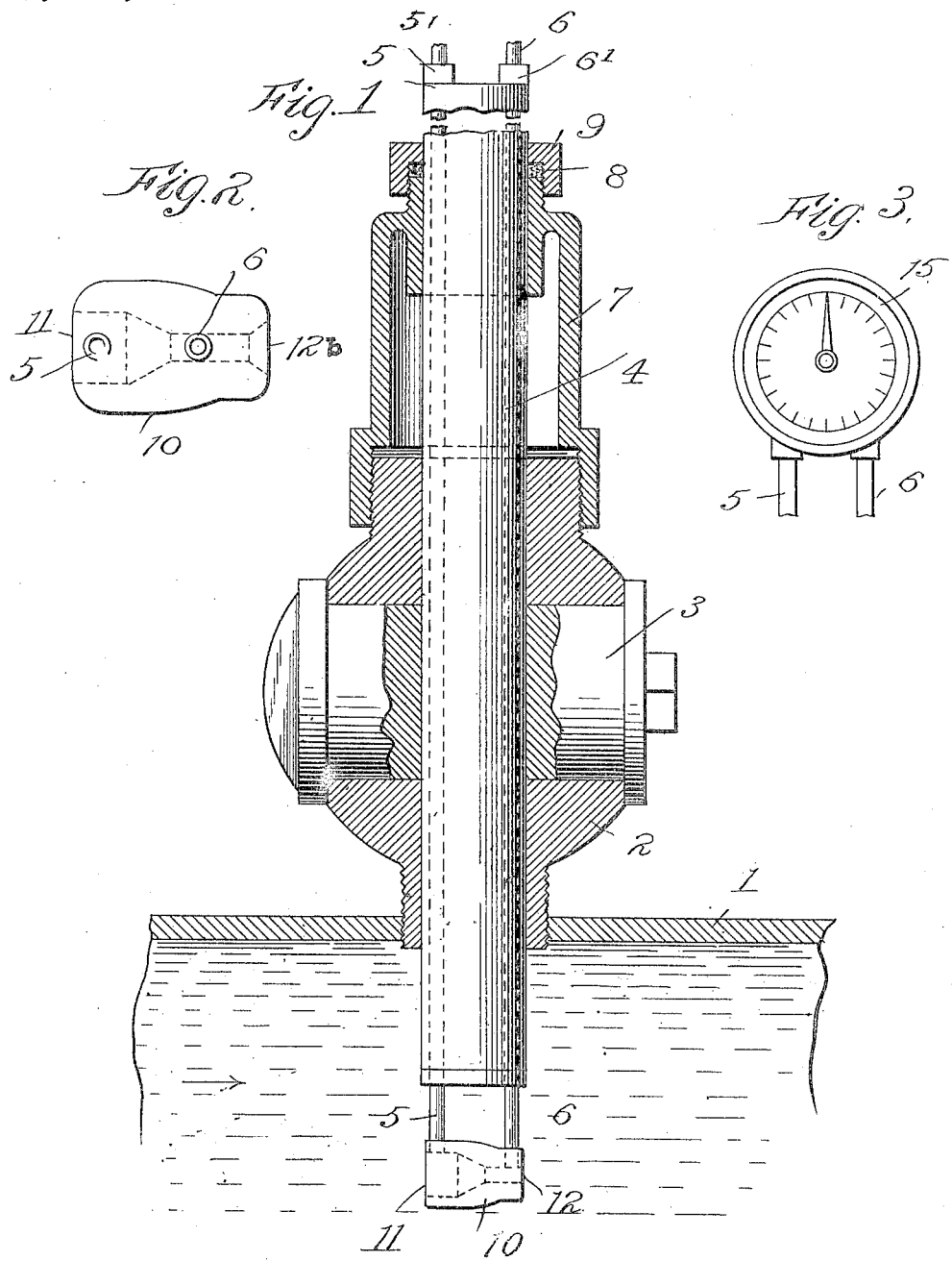

HAROLD T. HAVILL, OF NEW YORK, N. Y., ASSIGNOR OF ONE-FOURTH TO EGBERT U. HAVILL, OF NEW YORK, N. Y.

PITOMETER.

1,089,129. Specification of Letters Patent. Patented Mar. 3, 1914.

Application filed April 22, 1912. Serial No. 692,293.

*To all whom it may concern:*

Be it known that I, HAROLD T. HAVILL, a citizen of the United States, and a resident of the borough of Manhattan, city, county, and State of New York, have invented certain new and useful Improvements in Pitometers, of which the following is a full and clear specification, the particular novel features of my invention being set forth in the annexed claim.

My invention relates to means for measuring the fluid pressure at two points in the direction of the flow of the tube of varying diameter, through which the fluid flows. Tubes of the character which I employ are generally known at Venturi tubes and they have been employed for a similar purpose, in a form in which a section of the water-main itself is formed as a Venturi tube and whereby the pressure is measured at the wide end and at the contracted end of the tube. The disadvantages of such an arrangement are that it is only possible to measure the flow of water at that particular point of the system and that unless such a tube is inserted at every point where it might be desirable later to measure the flow of water, when the mains are laid, it is impossible later to ascertain the flow of water. Therefore the Venturi tube has not heretofore been employed for subsequently ascertaining the flow of water in places of the system where the leakages are suspected, which cannot be ascertained except by measuring the flow of water in the pipe and the amount of water drawn at the regular points of drainage.

My instrument is portable and capable of indicating differences of pressure between the two ends of a Venturi tube with an ordinary pressure gage so that cumbersome measuring devices such as U-tubes filled with a liquid of light specific gravity can be dispensed with.

In the accompanying drawings I have illustrated my invention.

In these drawings: Figure 1 shows a longitudinal vertical section through the entire device as adjusted in a water main in approximately full size. Fig. 2 is a plan view of the Venturi tube which I employ, in larger scale, and Fig. 3 represents in general outline a pressure gage used in connection with the pitometer.

The general construction of the apparatus is as follows.

1 indicates a portion of the water main in which the flow of water is to be measured.

2 is the cock which remains inserted or which can be inserted in pipes at any point where the flow of water is to be measured. The manner of subsequently attaching this fitting to water pipes is well known in the art so that description thereof is omitted herein.

The valve member 3 of the cock has a boring of suitable size to admit a tube 4 within which the two pipes 5 and 6 are disposed which are at their upper ends connected to any suitable pressure gage capable of indicating the difference in pressure in the two tubes, as for instance shown in general outline at 15 in Fig. 3. Cock 2 carries threaded to its upper end the auxiliary chamber 7 provided with a stuffing box 8 at its upper end through which the lower end of tube 4 is first inserted before valve member 3 of the cock is opened. After the gland 9 of the stuffing box is properly tightened the cock is opened and the tube inserted through valve member 3 down into the water main. By this expedient which is known in the art, unnecessary leakage of water is avoided while the tube 4 is inserted. Pipes 5 and 6 extend beyond the lower end of tube 4 and carry together at their lower ends Venturi tube 10. This tube has its wide portion 11 at the end which faces the onflowing water and its contracted portion 12 at the opposite end, care being taken that when tube 4 is inserted the longitudinal axis of the Venturi tube coincides with the direction of the flow of water. Pipe 5 communicates with the wide portion 11 of the Venturi tube and pipe 6 communicates with the contracted portion 12 of the Venturi tube. Now, when the tube is inserted as previously described, and part of the onflowing water (indicated by the arrow in Fig. 1) passes through the Venturi tube there will be a certain pressure $p$ in its portion 11 which is communicated to pipe 5. Part of the potential energy of the water when forced through the tube into the contracted portion 12 is transformed into kinetic energy so that the pressure in contracted portion 12 is smaller than $p$. This pressure is communicated to pipe 6. As above referred to the difference in pressure between the two pipes is measured at their outer ends by a suitable gage 15. Pitometers are known in the art in which for instance the lower end of pipe 5 is bent toward the onflowing water and the lower end of pipe 6 bent in the direction of the flow of the water, so that the difference in pressure caused by the impact of the onflowing water and the vacuum formed by the off flowing water can be measured at the outer ends of these two pipes. This difference in pressure is so slight that only very sensitive instruments such as for instance U-tubes, filled with specifically very light fluid, can be used to give fairly good results. My present instrument has the advantage over instruments such as referred to above, that the differences in pressure at the two ends of the Venturi tube are so great that a coarser instrument such as a pressure gage, will easily indicate them with sufficient exactness to calculate therefrom the flow of water in the pipe in the usual manner known in the art.

It may be stated that of course pipes 5 and 6, where they leave the upper end of tube 4 are led through small stuffing boxes 5' and 6' to prevent escape of water to the outside.

It may be also stated that while I have shown a convenient outside shape of the body 10 which contains the boring and which forms the Venturi tube, this form is in no way meant to indicate the only form feasible for my purpose. Also while I have shown in Fig. 1 the contracted portion 12 of the Venturi tube straight it may also flare outwardly as for instance shown in Fig. 2 at 12$^b$.

What I claim is:

A portable pitometer on the Venturi principle, comprising a suitable length of tubing forming the shell of the pitometer, a Venturi tube located adjacent to one end of said tubing having a pipe laterally connected adjacent to either of its ends, said pipes being located inside of said shell tubing and leading to its other end.

HAROLD T. HAVILL.

Witnesses:
 WM. A. COURTLAND,
 H. ALFRED JANKE.